（12）United States Patent
Zheng et al.

(10) Patent No.: US 10,405,067 B1
(45) Date of Patent: Sep. 3, 2019

(54) AUTOMATIC CABLE ARRANGEMENT DEVICE

(71) Applicant: Chengdu jiuxi robot technology co. LTD, Chengdu (CN)

(72) Inventors: Yuhong Zheng, Chengdu (CN); Xiangdong Li, Chengdu (CN)

(73) Assignee: Chengdu jiuxi robot technology co. LTD, Chengdu (CN)

( * ) Notice: Subject to any disclaimer, the term of this patent is extended or adjusted under 35 U.S.C. 154(b) by 0 days.

(21) Appl. No.: 16/365,685

(22) Filed: Mar. 27, 2019

(30) Foreign Application Priority Data

Apr. 11, 2018 (CN) .......................... 2018 1 0320717

(51) Int. Cl.
*H04Q 1/14* (2006.01)
*H01R 13/66* (2006.01)

(52) U.S. Cl.
CPC ............. *H04Q 1/14* (2013.01); *H01R 13/665* (2013.01)

(58) Field of Classification Search
CPC ................................ H01R 13/665; H04Q 1/14
USPC .................................................. 379/325–330
See application file for complete search history.

(56) References Cited

U.S. PATENT DOCUMENTS

| 2013/0236141 | A1* | 9/2013 | Yamauchi | G02B 6/444 385/75 |
| 2015/0093090 | A1* | 4/2015 | Aznag | G02B 6/4471 385/135 |
| 2019/0172032 | A1* | 6/2019 | Wang | G06Q 20/18 |

* cited by examiner

*Primary Examiner* — Harry S Hong
(74) *Attorney, Agent, or Firm* — Gokalp Bayramoglu

(57) ABSTRACT

An automatic cable arrangement device including a portal frame, an electrical control cabinet, a cable arrangement device body and a cable swinging device. The electrical control cabinet is arranged on the side face of the portal frame. The cable arrangement device body is arranged on the portal frame. The cable swinging device is connected to the portal frame through a connecting plate and comprises an X-direction moving device, a Y-direction moving device, a Z-direction moving device, a distance measuring device and a swinging wheel set. The swinging wheel set is configured to perform cable swinging. The distance measuring device is configured to measure a distance. When the measured distance is smaller than a set range, the electrical control cabinet controls the cable swinging device to move in the X-direction direction, the Y-direction direction and the Z-direction direction, and such an operation is repeated to perform cable arrangement.

10 Claims, 9 Drawing Sheets

AUTOMATIC CABLE ARRANGEMENT DEVICE

CROSS REFERENCE TO THE RELATED APPLICATIONS

This application is based upon and claims priority to Chinese Patent Application No. 201810320717.2, filed on Apr. 11, 2018, the entire contents of which are incorporated herein by reference.

TECHNICAL FIELD

The present invention relates to the technical field of cable winding, in particular to an automatic cable arrangement device.

BACKGROUND

Wire cables or electric cables are indispensable materials for building urban communications. The production process of the wire cable is as follows: a plastic is melted and conveyed to an extruder; the extruded cable enters a cooling bath for cooling; the cooled cable passes through a guide wheel and is wound around a cable reel of a cable swinging mechanism; the guide wheel is rotatably mounted on an execution end of a horizontal moving mechanism which is parallel to the cable reel. When winding is performed, the horizontal moving mechanism drives the guide wheel to move linearly in one direction, and the guide wheel guides the cable to be wound around a cylinder of the cable reel during the movement. When the cable is about to wrap around to the end circle, the horizontal moving mechanism is controlled to drive the guide wheel to perform a reverse linear motion, thereby winding two circles of the cable on the cylinder of the cable reel. A wooden disc is further mounted on two ends of the cylinder of the cable reel respectively and used for restricting the wound cable from coming out of the cylinder. However, the inner side surface of each wooden disc is not flat, and during the rotation along with the cylinder, the wooden discs move eccentrically to cause a gap between the last circle of the wound cable and each wooden disc, which eventually leads to looseness between each circle of the cable, accompanied with the defect of untight arrangement, thereby affecting the cable arrangement quality. Moreover, many cable arrangement devices on the market are only suitable for cables with small diameters, and cable arrangement devices for large-diameter cables require higher strength requirements. In view of the above problems, an automatic cable arrangement device is designed.

SUMMARY

An objective of the present invention is to overcome the defects of the prior art and provide an automatic cable arrangement device which has the advantages that the structure is compact; after a cable is wound, all the circles of the cable are tightly arranged; the cable arrangement quality is improved; the automation degree is high; ordered arrangement of the cable on a reel is achieved. The automatic able arrangement device is adaptable to arrangement of cables of various diameters, and to ordered arrangement of cables on a cable reel.

The objective of the present invention is achieved by the following technical solution: an automatic cable arrangement device comprises portal frames, an electrical control cabinet, a cable arrangement device body and a cable swinging device, wherein the portal frame comprises a right portal frame and a left portal frame; a connecting shaft of the right portal frame is embedded into a connecting shaft of the left portal frame; the electrical control box is placed on the side surface of the portal frame; the cable arrangement device body is arranged on the portal frame; the cable swinging device is connected to the portal frame through a connecting plate; the automatic cable arrangement device is characterized in that the cable swinging device comprises an X-direction moving device, a Y-direction moving device, a Z-direction moving device, a distance measuring device and a swinging wheel set;

the X-direction moving device comprises a motor X, a rack X, a gear X, and a slide rail X, wherein the motor X is connected to an L plate and a backing plate through a connecting frame I; the L plate is disposed on the backing plate; the backing plate is disposed on a slide block of a slide rail Y; the gear X is connected to a power output shaft of the motor X; the rack X is meshed with the gear X; the rack X is disposed on the bottom of an upright L plate; the slide rail X is disposed on the bottom of the upright L plate; the slide block of the slide rail X is disposed on the L plate;

the Y-direction moving device comprises a motor Y, a lead screw, a cross arm, and a slide rail Y, wherein the motor Y, the lead screw and the slide rail X are disposed on the cross arm; the motor Y is disposed at one end of the cross arm; the lead screw is connected to a power output shaft of the motor Y; a slide block of the slide rail Y is connected to the backing plate;

the Z-direction moving device comprises a column Z, a slide Z, a rack Z, a motor Z, a speed reducer, a gear Z and a shaft Z, wherein the column Z is mounted vertically; the slide rail Z and the rack Z are vertically mounted on the column Z; a slide block of the slide rail Z is connected to the upright L plate; the speed reducer and the motor Z are mounted on the side surface of the upright L plate; the speed reducer is connected to a power output shaft of the motor Z; the shaft Z passes through the upright L plate and is connected to the speed reducer; the gear Z is disposed in the upright L plate; the shaft Z passes through the gear Z; the gear Z is meshed with the rack Z;

the distance measuring device is connected to the column Z; the swinging wheel set is connected to the motor D; the motor D is connected to a connecting frame II; the connecting frame II is connected to the column Z.

Further, the lead screw is matched with a corresponding lead screw nut; the lead screw nut is mounted in a lead screw nut base; the lead screw nut base is connected to the bottom of the L plate; the lead screw is mounted on two support bases; the two support bases are disposed at two ends of the lead screw; the lead screw passes through a deep groove ball bearing and is connected to the support bases; the deep groove ball bearing is fixedly mounted on the cross arm.

Further, two cable protection rollers are connected to the bottom of a roller bracket; the roller bracket is connected to the upright L plate; the two cable protection rollers are vertically symmetrically mounted on the roller bracket.

Further, the slide rail X is a single slide rail, and each of the slide rail Y and the slide rail Z is a double slide rail.

Further, the rack Z is disposed in the middle of the column Z, and the rack X is disposed in the middle of the bottom of the upright L plate.

Further, each of the motor X, the motor Y, the motor Z and the motor D is a motor with a brake, and each of the gear Z and the gear X is a cylindrical gear.

Further, the distance measuring device is connected to a head connecting frame, and the head connecting frame is connected to the column Z.

Further, a speed reducer bracket is connected to the upright L plate, and the top of the speed reducer is connected to the speed reducer bracket.

Further, the distance measuring device corresponds to the swinging wheel set.

Further, the cable arrangement device comprises a cable reel and a rotating box, wherein two ends of the cable reel are connected to clamping shafts; the left clamping shaft passes through the clamping block and is connected to the rotating box, and the right clamping shaft is connected to the clamping block; the clamping block is connected to the right portal frame and the left portal frame.

The automatic cable arrangement device has the following advantages: the structure is compact; after a cable is wound, all the circles of the cable are tightly arranged; the cable arrangement quality is improved; the automation degree is high; ordered arrangement of the cable on the cable reel is achieved; in addition, the portal frames enhance the strength of the whole device, and therefore, the automatic cable arrangement device is adaptable to arrangement of cables of larger diameters.

In drawings, reference symbols represent the following components: 1—right portal frame, 2—left portal frame, 3—electrical control cabinet, 4—cable arrangement device body, 5—cable swinging device, 6—cable protection roller, 7—roller bracket, 8—upright L plate, 9—swinging wheel set, 10—distance measuring device, 11—motor D, 12—column Z, 13—slide rail Z, 14—rack Z, 15—motor Z, 16—speed reducer, 17—gear Z, 18—shaft Z, 19—motor Y, 20—lead screw, 21—cross arm, 22—slide rail Y, 23—motor X, 24—rack X, 25—gear X, 26—slide rail X, 27—support base, 28—deep groove ball bearing, 29—connecting plate, 30—connecting frame I, 31—backing plate, 32—L plate, 33—connecting frame II.

DETAILED DESCRIPTION

Figure 1:
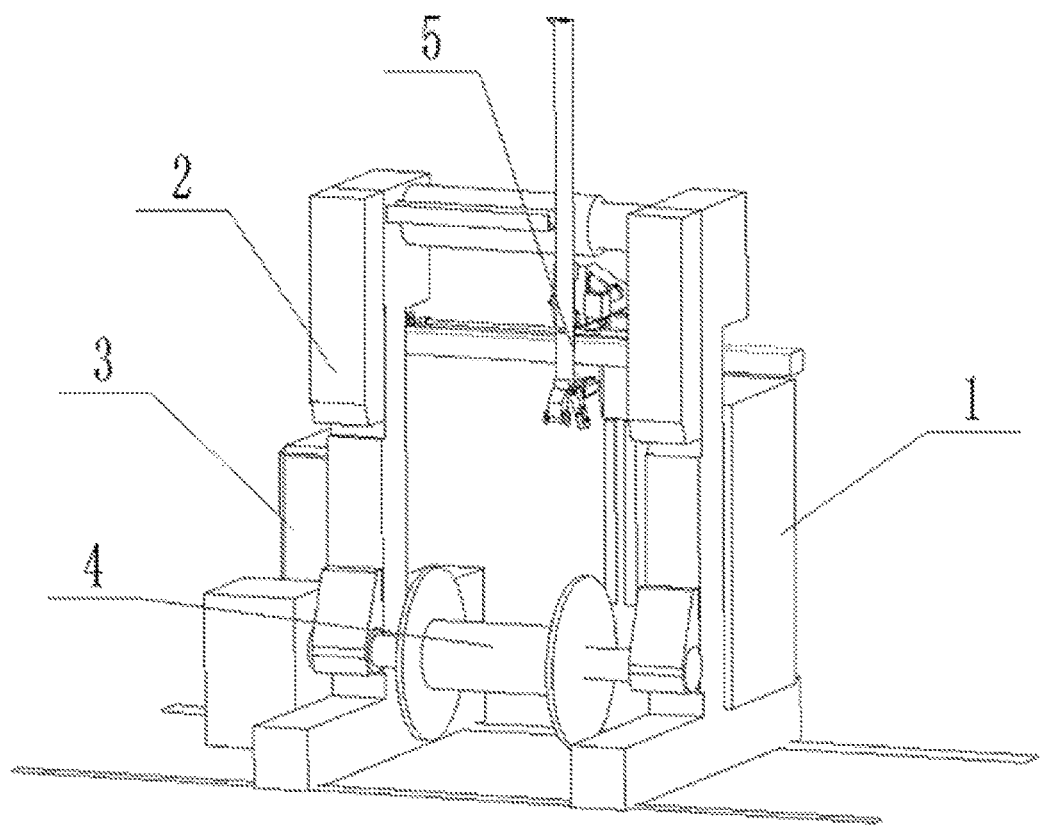
FIG. 1 is a structural schematic diagram of the present invention.
Figure 2:
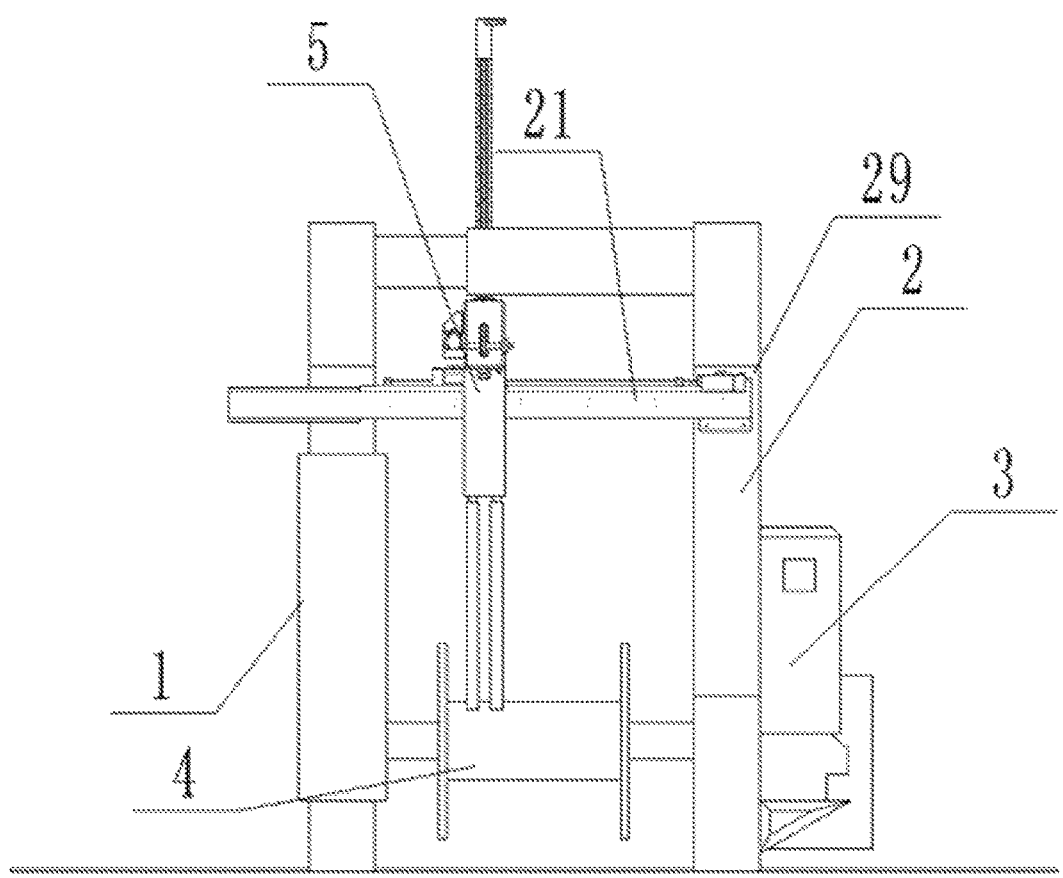
FIG. 2 is a rear view of a structure of the present invention.
Figure 3:
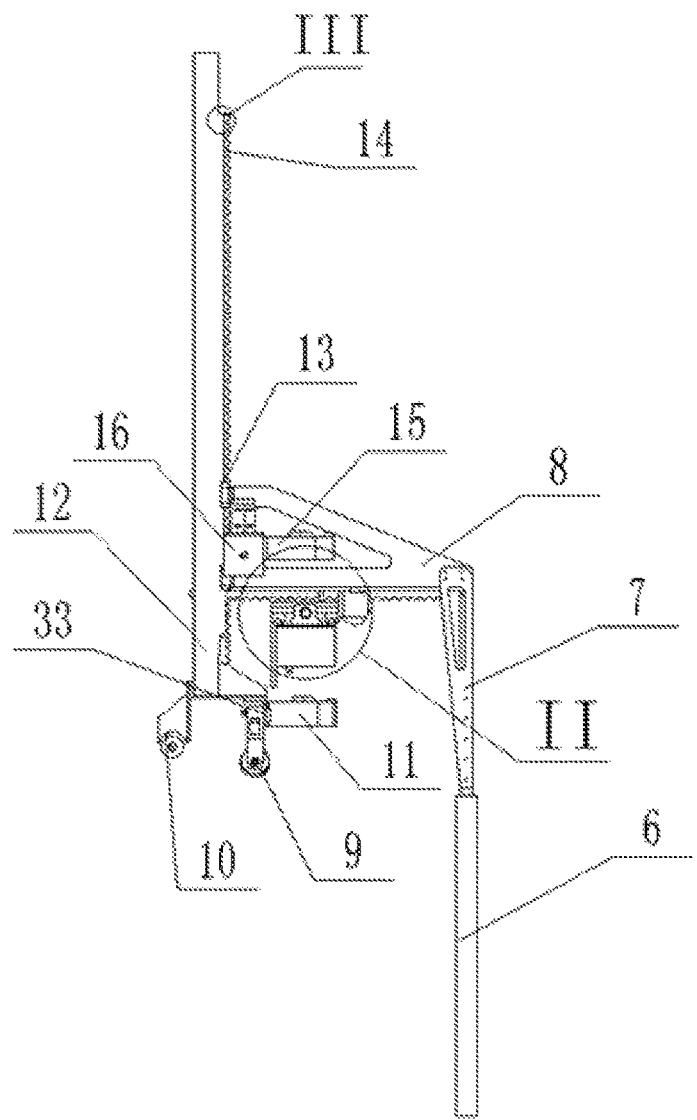
FIG. 3 is a right view of a cable swinging device of the present invention.
Figure 4:
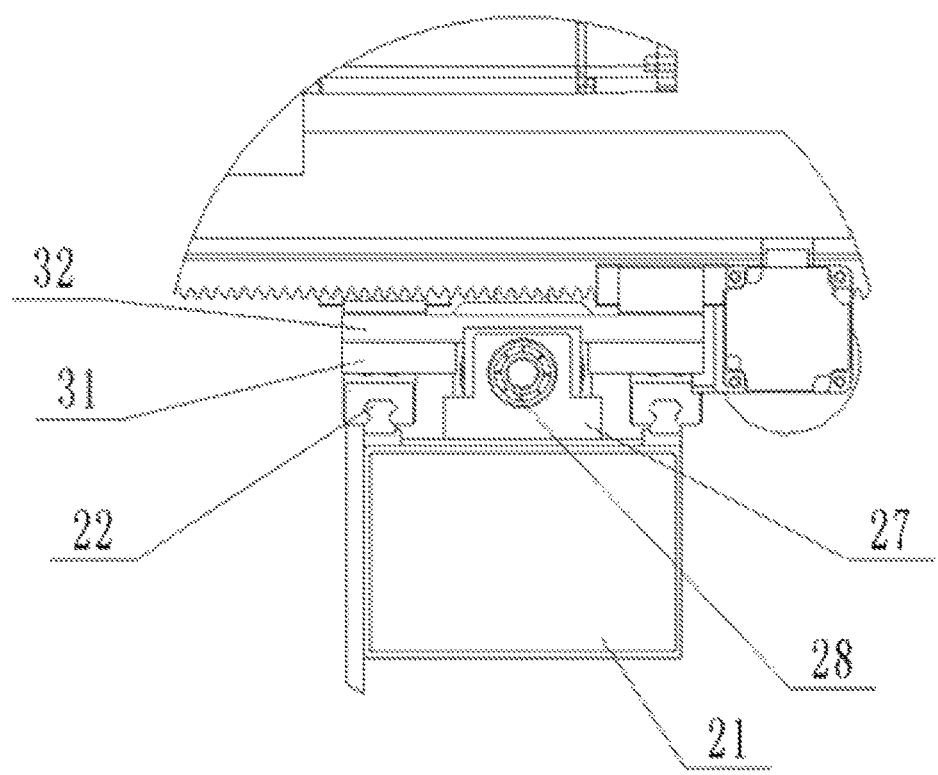
FIG. 4 is a locally enlarged view II of FIG. 3.
Figure 5:
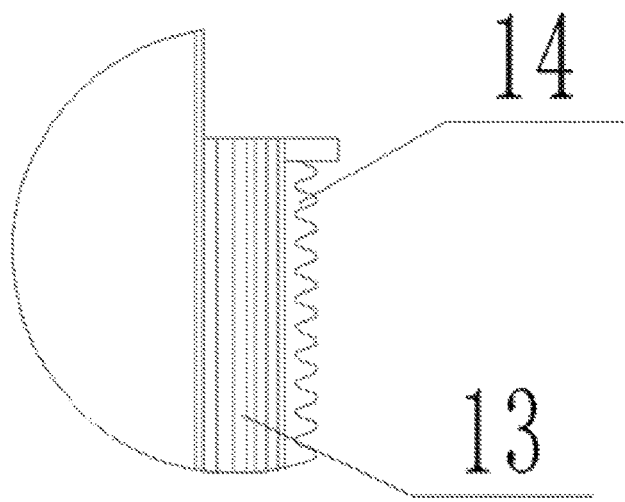
FIG. 5 is a locally enlarged view III of FIG. 3.
Figure 6:
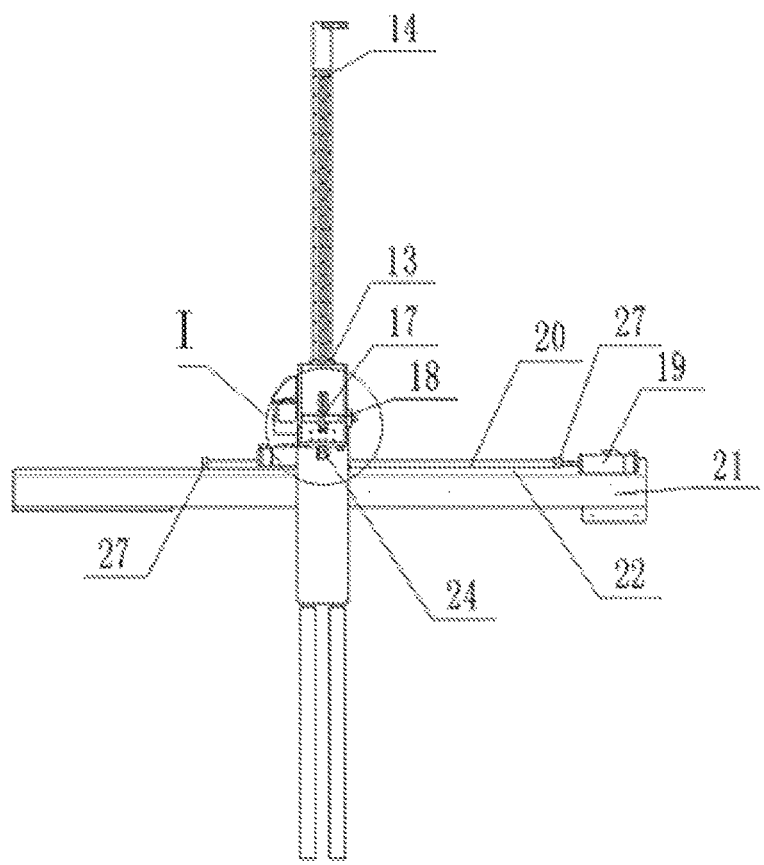
FIG. 6 is a rear view of the cable swinging device body of the present invention.
Figure 7:
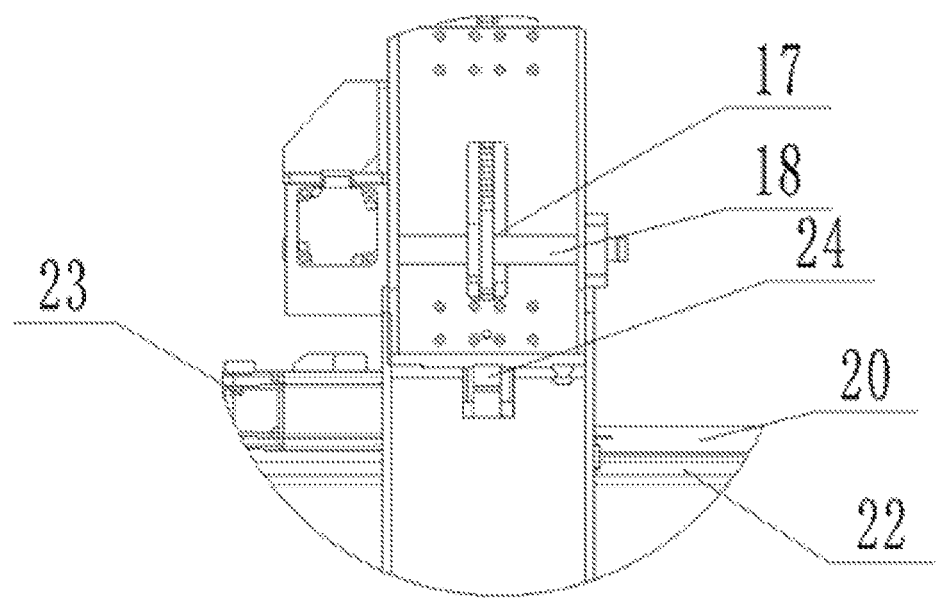
FIG. 7 is a locally enlarged view I of FIG. 6.
Figure 8:
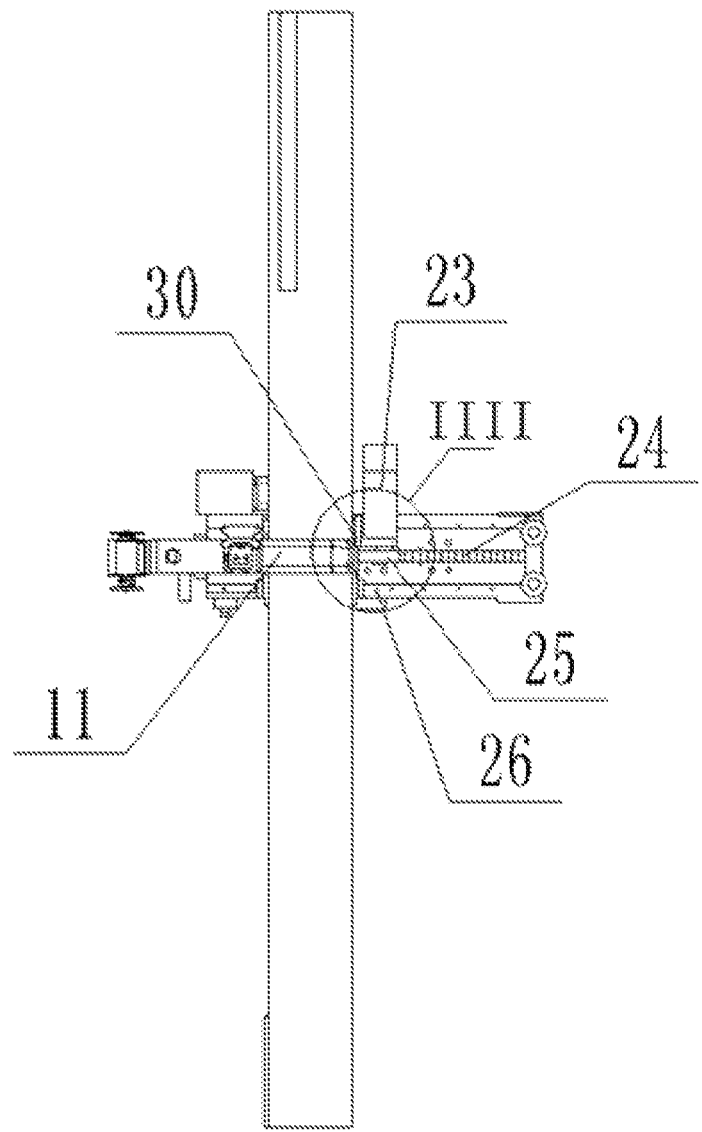
FIG. 8 is a bottom view of the cable swinging device of the present invention.
Figure 9:
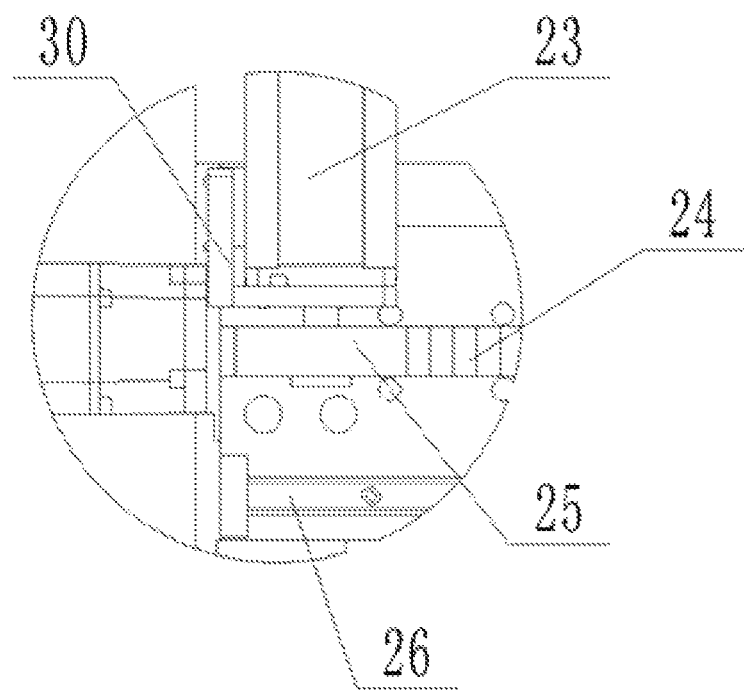
FIG. 9 is a locally enlarged view III of FIG. 8.

The present invention will be further described below in conjunction with the accompanying drawings, and the protection scope of the present invention is not limited to the followings:

as shown in FIGS. 1-9, an automatic cable arrangement device comprises a portal frame, an electrical control cabinet 3, a cable arrangement device body 4 and a cable swinging device 5, wherein the portal frame comprises a right portal frame 1 and a left portal frame 2; a connecting shaft of the right portal frame 1 is embedded into a connecting shaft of the left portal frame 2; the electrical control box 3 is disposed on the side surface of the portal frame; the cable arrangement device body 4 is disposed on the portal frame; the cable swinging device 5 is connected to the portal frame through a connecting plate 29; the automatic cable arrangement device is characterized in that the cable swinging device 5 comprises an X-direction moving device, a Y-direction moving device, a Z-direction moving device, a distance measuring device 10 and a swinging wheel set 9;

the X-direction moving device comprises a motor X23, a rack X24, a gear X25, and a slide rail X26, wherein the motor X23 is connected to an L plate 32 and a backing plate 31 through a connecting frame 130; the L plate 32 is disposed on the backing plate 31; the backing plate 31 is disposed on a slide block of a slide rail Y22; the gear X25 is connected to a power output shaft of the motor X23; the rack X24 is meshed with the gear X25; the rack X24 is disposed on the bottom of an upright L plate 8; the slide rail X26 is disposed on the bottom of the upright L plate 8; the slide block of the slide rail X26 is disposed on the L plate 32;

the Y-direction moving device comprises a motor Y19, a lead screw 20, a cross arm 21, and a slide rail Y22, wherein the motor Y19, the lead screw 20 and the slide rail Y22 are disposed on the cross arm 21; the motor Y19 is disposed at one end of the cross arm 21; the lead screw 20 is connected to a power output shaft of the motor Y19; a slide block of the slide rail Y22 is connected to the backing plate 31;

the Z-direction moving device comprises a column Z12, a slide Z13, a rack Z14, a motor Z15, a speed reducer 16, a gear Z17 and a shaft Z18, wherein the column Z12 is mounted vertically; the slide rail Z13 and the rack Z14 are vertically mounted on the column Z12; a slide block of the slide rail Z13 is connected to the upright L plate 8; the speed reducer 16 and the motor Z15 are mounted on the side surface of the upright L plate 8; the speed reducer 16 is connected to a power output shaft of the motor Z15; the shaft Z18 passes through the upright L plate 8 and is connected to the speed reducer 16; the gear Z17 is disposed in the upright L plate 8; the shaft Z18 passes through the gear Z17; the gear Z17 is meshed with the rack Z14; and the distance measuring device 10 is connected to the column Z12; the swinging wheel set 9 is connected to the motor D11; the motor D11 is connected to a connecting frame II33; the connecting frame II33 is connected to the column Z12.

As an optional embodiment, the lead screw 20 is matched with a corresponding lead screw nut; the lead screw nut is mounted in a lead screw nut base; the lead screw nut base is connected to the bottom of the L plate 32; the lead screw 20 is mounted on two support bases 27; the two support bases 27 are disposed at two ends of the lead screw 20; the lead screw 20 passes through a deep groove ball bearing 28 and is connected to the support bases 27; the deep groove ball bearing 28 is fixedly mounted on the cross arm 21.

As an optional embodiment, two cable protection rollers 6 are connected to the bottom of a roller bracket 7; the roller bracket 7 is connected to the upright L plate 8; the two cable protection rollers 6 are vertically symmetrically mounted on the roller bracket 7.

As an optional embodiment, the slide rail X26 is a single slide rail, and each of the slide rail Y22 and the slide rail Z13 is a double slide rail.

As an optional embodiment, the rack Z14 is disposed in the middle of the column Z12, and the rack X24 is disposed in the middle of the bottom of the upright L plate 8.

As an optional embodiment, each of the motor X23, the motor Y19, the motor Z15 and the motor D11 is a motor with a brake, and each of the gear Z17 and the gear X25 is a cylindrical gear.

As an optional embodiment, the distance measuring device 10 is connected to a head connecting frame, and the head connecting frame is connected to the column Z12.

As an optional embodiment, a speed reducer bracket is connected to the upright L plate 32, 8, and the top of the speed reducer 16 is connected to the speed reducer bracket.

As an optional embodiment, the distance measuring device 10 corresponds to the swinging wheel set 9.

As an optional embodiment, the cable arrangement device 4 comprises a cable reel and a rotating box, wherein two ends of the cable reel are connected to clamping shafts; the left clamping shaft is connected to the rotating box through a clamping block, and the right clamping shaft is connected to the clamping block; the clamping block is connected to the right portal frame 1 and the left portal frame 2.

The working process of the automatic cable arrangement device of the present invention is as follows:

S1, in an initial test state, various mechanisms are installed according to the regulations; the extruded cable passes through the cable protection roller 6 and is disposed on a guide wheel of the swinging wheel set 9, and the head end of the cable is fixed on the cable reel, thereby ensuring that the distance measuring device 10 is positioned between two disks of the cable arrangement device body 4, and meanwhile ensuring that a groove of the guide wheel of the swinging wheel set 9 inclines backwards;

S2, the rotating box of the cable arrangement device body 4 rotates to drive the cable reel to rotate; the cable reel begins to wind the cable, and meanwhile the electrical control cabinet 3 controls the motor Y19 of the Y-direction moving device to operate; the motor Y19 operates to drive the lead cable 20 to rotate, and further the entire cable swinging device 5 moves horizontally; with the horizontal movement of the cable swinging device 5 and the rotation of the cable reel, the cable is gradually wound on the cable reel in a length direction;

S3, while winding, if the distance between the distance measuring device 10 and the disk of the cable arrangement device body 4 on the side close to the distance measuring device 10 is greater than a set distance value, cable swinging is continued; if the distance between the distance measuring device 10 and the disk of the cable arrangement device body 4 on the side close to the distance measuring device 10 is less than a set distance value, it is indicated that the cable reel is tightly packed with a first circle of cable, and the distance measuring device 10 sends an electric signal to the control cabinet 3;

S4, the control cabinet 3 controls the Y-direction moving device move in an opposite direction to continue cable arrangement, and such an operation is repeated to realize tight arrangement of the cable and improve the cable arrangement quality; and S5, while repeating the cable arrangement, the distance measuring device 10 measures the distance between the cable on the cable reel and the distance measuring device 10; if the distance between the cable on the cable reel and the distance measuring device 10 is within a set reasonable distance range, normal cable arrangement is continued; if the distance between the cable on the cable reel and the distance measuring device 10 is less than a minimum value of the set reasonable distance range, the distance measuring device 10 immediately sends an electric signal to the control cabinet 3, and the control cabinet 3 drives the motor Z15 and the motor X23 to work, thereby causing the cable arranging device body 4 to move in the Z direction and the X direction, such that the distance between the cable on the cable reel and the distance measuring device 10 is within the set reasonable distance range; then, step S4 is repeated to operate circularly till the cable is wound on the cable reel in multiple circles, thereby realizing automatic cable arrangement and continuous cable arrangement of the cable on the cable reel, and improving the cable arrangement efficiency.

What is claimed is:

1. An automatic cable arrangement device, comprising: a portal frame, an electrical control cabinet, a cable arrangement device body and a cable swinging device; wherein the portal frame comprises a right portal frame and a left portal frame; a connecting shaft of the right portal frame is embedded into a connecting shaft of the left portal frame; the electrical control cabinet is disposed on a side surface of the portal frame; the cable arrangement device body is arranged on the portal frame; the cable swinging device is connected to the portal frame through a connecting plate; the cable swinging device comprises an X-direction moving device, a Y-direction moving device, a Z-direction moving device, a distance measuring device and a swinging wheel set;

the X-direction moving device comprises a motor X, a rack X, a gear X, and a slide rail X, wherein the motor X is connected to an L plate and a backing plate through a connecting frame I; the L plate is disposed on the backing plate; the backing plate is disposed on a slide block of a slide rail Y; the gear X is connected to a power output shaft of the motor X; the rack X is meshed with the gear X; the rack X is disposed on the bottom of an upright L plate; the slide rail X is disposed on the bottom of the upright L plate; a slide block of the slide rail X is disposed on the L plate;

the Y-direction moving device comprises a motor Y, a lead screw, a cross arm, and a slide rail Y, wherein the motor Y, the lead screw and the slide rail Y are disposed on the cross arm; the motor Y is disposed at one end of the cross arm; the lead screw is connected to a power output shaft of the motor Y; a slide block of the slide rail Y is connected to the backing plate;

the Z-direction moving device comprises a column Z, a slide rail Z, a rack Z, a motor Z, a speed reducer, a gear Z and a shaft Z, wherein the column Z is mounted vertically; the slide rail Z and the rack Z are vertically mounted on the column Z; a slide block of the slide rail Z is connected to the upright L plate; the speed reducer and the motor Z are mounted on the side surface of the upright L plate; the speed reducer is connected to a power output shaft of the motor Z; the shaft Z passes through the upright L plate and is connected to the speed reducer; the gear Z is disposed in the upright L plate; the shaft Z passes through the gear Z; the gear Z is meshed with the rack Z; and the distance measuring device is connected to the column Z; the swinging wheel set is connected to a motor D; the motor D is connected to a connecting frame II; the connecting frame II is connected to the column Z.

2. The automatic cable arrangement device according to claim 1, wherein the lead screw is matched with a corresponding lead screw nut; the lead screw nut is mounted in a lead screw nut base; the lead screw nut base is connected to the bottom of the L plate; the lead screw is mounted on two support bases; the two support bases are disposed at two ends of the lead screw; the lead screw passes through a deep groove ball bearing and is connected to the support bases; the deep groove ball bearing is fixedly mounted on the cross arm.

3. The automatic cable arrangement device according to claim 1, wherein two wire protection rollers are connected to the bottom of a roller bracket; the roller bracket is connected to the upright L plate; the two wire protection rollers are vertically symmetrically mounted on the roller bracket.

4. The automatic cable arrangement device according to claim 1, wherein the slide rail X is a single slide rail, and each of the slide rail Y and the slide rail Z is a double slide rail.

5. The automatic cable arrangement device according to claim 1, wherein the rack Z is disposed in the middle of the column Z, and the rack X is disposed in the middle of the bottom of the upright L plate.

6. The automatic cable arrangement device according to claim 1, wherein each of the motor X, the motor Y, the motor Z and the motor D is a motor with a brake, and each of the gear Z and the gear X is a cylindrical gear.

7. The automatic cable arrangement device according to claim 1, wherein the distance measuring device is connected to a head connecting frame, and the head connecting frame is connected to the column Z.

8. The automatic cable arrangement device according to claim 1, wherein a speed reducer bracket is connected to the upright L plate, and the top of the speed reducer is connected to the speed reducer bracket.

9. The automatic cable arrangement device according to claim 1, wherein the distance measuring device corresponds to the swinging wheel set.

10. The automatic cable arrangement device according to claim 1, wherein the cable arrangement device body comprises a cable reel and a rotating box, wherein two ends of the cable reel are connected to clamping shafts; the left clamping shaft passes through the clamping block and is connected to the rotating box, and the right clamping shaft is connected to the clamping block; the clamping block is connected to the right portal frame and the left portal frame.

* * * * *